(12) United States Patent
Jinbo

(10) Patent No.: US 6,931,954 B2
(45) Date of Patent: Aug. 23, 2005

(54) POWER TRANSMISSION DEVICE

(75) Inventor: Naoto Jinbo, Yokohama (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 10/650,719

(22) Filed: Aug. 29, 2003

(65) Prior Publication Data

US 2004/0103732 A1 Jun. 3, 2004

(30) Foreign Application Priority Data

Nov. 28, 2002 (JP) .......................... 2002-345599

(51) Int. Cl.[7] .................... F16H 19/00; F16H 35/00; F16H 37/00; F16H 33/00
(52) U.S. Cl. ...................... 74/64; 74/810.1; 74/322
(58) Field of Search .................. 74/640, 810.1, 74/321–324; 475/331, 349, 258–259; 192/48.92, 20

(56) References Cited

U.S. PATENT DOCUMENTS 4,080,827 A * 3/1978 Esola ...................... 73/275
5,176,038 A * 1/1993 Inokuchi et al. ............... 74/129
5,386,745 A * 2/1995 Inokuchi ...................... 81/57.3

FOREIGN PATENT DOCUMENTS

JP          2525010          11/1996

* cited by examiner

Primary Examiner—Tisha Lewis
(74) Attorney, Agent, or Firm—Manabu Kanesaka (57) ABSTRACT

A power transmission device includes a pair of gear assemblies and an idle. Each of the gear assemblies includes a first gear having continuous external teeth on a peripheral wall and a second gear having continuous external teeth on a peripheral wall. The first gear and second gear are arranged to form a one-way clutch. When the first gear rotates in one direction relative to the second gear, the first gear is not connected to the second gear. When the first gear rotates in the other direction relative to the second gear, the first gear is connected to the second gear. The external teeth of the first gears in the gear assemblies engage each other, and the external teeth of the second gears in the gear assemblies engage the idle gear. One direction output at the second gear is obtained regardless of an input direction at the first gear.

8 Claims, 7 Drawing Sheets

POWER TRANSMISSION DEVICE

BACKGROUND OF THE INVENTION AND RELATED ART STATEMENT

The present invention relates to a power transmission device in which an output shaft always rotates in the same direction when an input shaft is rotated in either forward or reverse direction.

There is a driving device such as a manual pencil sharpener and various types of drilling machines in which a driving unit at an output side is operated when a handle is rotated in one direction (forward rotation) and the driving unit becomes idle or a non-operating state when the handle is rotated in a reverse direction (reverse rotation). In terms of configuration, a device may be provided with a one-way clutch for transmitting a rotational drive of a handle to a driving unit. In such a driving device, from an operational point of view, the operational efficiency can be improved when a driving unit (output side) can rotate in the same direction regardless of the forward rotation or the reverse rotation of a handle (input shaft side), i.e. a rotational direction of the handle. However, no conventional power transmission mechanism can transmit the drive power in such a manner, and there is no prior art document showing a power transmission device at least with a simple or compact configuration.

Figure 8A:
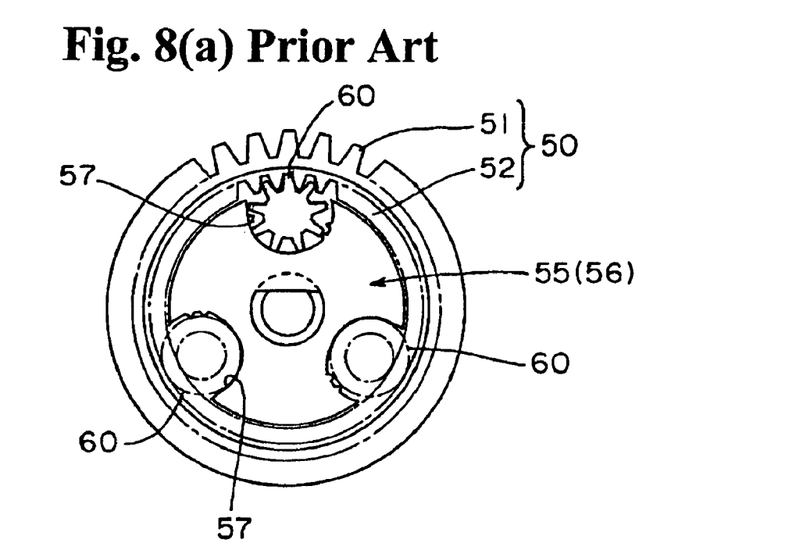
FIGS. 8(a)–8(c) are views showing a conventional gear assembly.

Japanese Patent Publication (Kokai) No. 10-331941 has disclosed a conventional one-way clutch. As shown in FIG. 8(a), the one-way clutch includes an outer member 50, an inner member 55, and planetary gears 60. The outer member 50 is a gear having external teeth 51 and internal teeth 52 formed on a peripheral wall. The inner member 55 has a holding portion rotatably disposed in an inside of the outer member 50. The holding portion 56 has several depressions 57 provided on a common circle and having an opening at a side opposite to the internal teeth, and a plurality of projections 58 is provided in an inside of the depressions. Each of the planetary gears 60 engages the internal teeth 52 and loosely housed in each of the depressions 57.

Figure 8B:
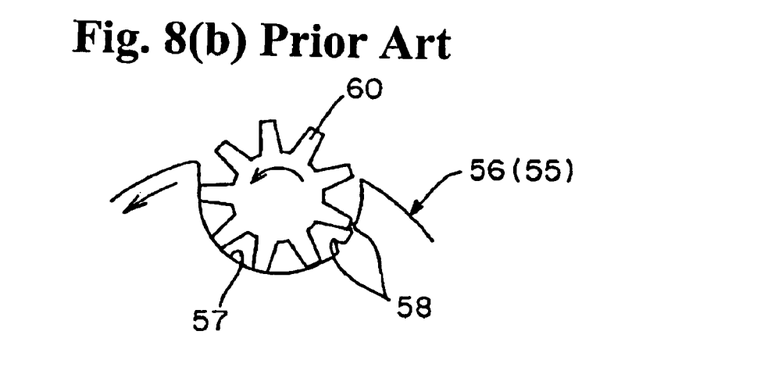
Figure 8C:
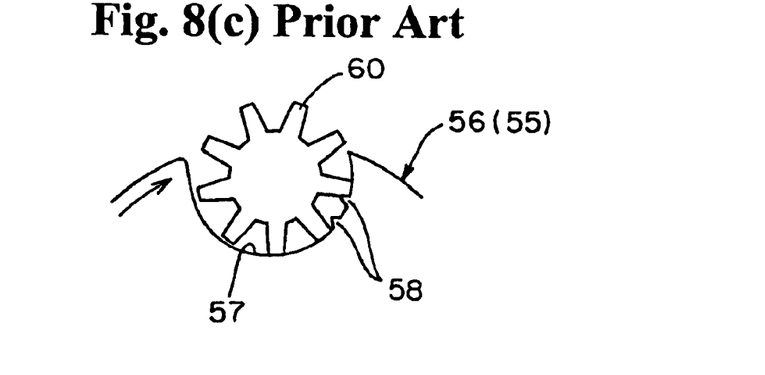

As shown in FIG. 8(b), in this clutch, when the inner member 55 is rotated in one direction relative to the outer member 50, the planetary gear 60 rotates at the inside of the depression 57 accompanied with the rotation of the inner member (rotates idle relative to the outer member 50). As shown in FIG. 8(c), when the inner member 55 is rotated in the opposite direction relative to the outer member 50, the planetary gear 60 rotates in association with the rotation of the inner member, and a part of the teeth of the planetary gear 60 engages the projections 58 so that the outer member 50 rotates together.

As described above, there are only a small number of conventional power transmission devices having a simple and small mechanism, in which an output shaft can always rotate in the same direction when an input shaft is rotated either in the forward rotation or reverse rotation. Therefore, in an application of a driving apparatus, it is difficult to obtain high operational efficiency or easy handling in the case of the manual operation. Also, it is necessary to increase the number of switching between the forward rotation and reverse rotation of the motor more than necessary in the case of the automatic operation.

The present invention has been developed from the above-mentioned background, and an object of the present invention is to provide a power transmission device having a simple and compact mechanism in order to improve the operational efficiency and make it easy to apply.

Further objects and advantages of the invention will be apparent from the following description of the invention.

SUMMARY OF INVENTION

In order to achieve the above-mentioned objects, according to the present invention, a power transmission device is disposed between an input shaft side and an output shaft side, in which an output shaft always rotates in the same direction when an input shaft rotates in either a forward direction or reverse direction. The power transmission device includes a pair of gear assemblies and an idle gear rotatably supported on the power transmission device. Each of the gear assemblies includes a first gear having continuous external teeth formed on a peripheral wall thereof, and a second gear having continuous external teeth formed on a peripheral wall thereof. The first gear and the second gear are arranged to be a gear assembly as a one-way clutch. When the first gear rotates in one direction relative to the second gear, the first gear is not connected to the second gear. When the first gear rotates in the other direction relative to the second gear, the first gear is connected to the second gear. The external teeth of the first gears in the gear assemblies engage each other, and the external teeth of the second gears in the gear assemblies engage the idle gear.

In the invention, when the first gear in one of the two gear assemblies is set to be an input shaft side and the second gear in the other of the two gear assemblies is set to be an output shaft side, the output shaft always rotates in the same direction when the input shaft is rotated either clockwise (hereinafter, referred to as a forward rotation or a forward direction) or counterclockwise (hereinafter, referred to as a reverse rotation or a reverse direction).

In the gear assemblies of the invention, when the first gear rotates in the forward direction, the first gear in the one gear assembly is connected to the second gear. When the first gear rotates in the reverse direction, the first gear is not connected to the second gear. In this case, when the first gear (input shaft side) in the one gear assembly rotates in the reverse direction, the first gear in the other gear assembly rotates in the forward direction, and the second gear of the other gear assembly rotates in the forward direction. Also, the idle gear makes the reverse rotation, and the second gear of the one gear assembly makes the forward rotation. When the first gear (input shaft side) in the one gear assembly rotates in the forward direction, the second gear of the one gear assembly makes the forward rotation, and the idle gear makes the reverse rotation. Also, the second gear of the other gear assembly rotates in the forward direction, and the first gear in the other gear assembly rotates in the reverse direction.

Accordingly, in the power transmission device of the invention, when the second gear of the other gear assembly is set to be the output shaft side, the second gear rotates in the forward rotation regardless of the rotational direction of the input shaft side, i.e. the first gear of the one gear assembly. Further, when the second gear of the one gear assembly is set to be the output shaft side, the second gear makes the forward rotation regardless of the rotational direction of the input shaft side, or the first gear of the other gear assembly.

In the present invention, the power transmission device uses the gear assemblies (gear assemblies composing a one-way clutch). As a result, the output shaft always rotates in the same direction regardless of the rotational direction of the input shaft, thereby making the device simple and small, and making it possible to use the device at a high-speed rotation.

According to the invention, the gear assembly comprises a first gear, a second gear and planetary gears. The first gear includes external teeth and internal teeth formed on a peripheral wall thereof. The second gear includes a holding portion rotatably attached to the first gear and having a depression with an opening facing the internal teeth of the first gear, and external teeth formed on a peripheral wall thereof and projecting from the holding portion. The planetary gear is disposed in the depression for engaging the internal tooth of the first gear. When the first gear rotates in one direction relative to the second gear, the planetary gear rotates free in the depression so that the first gear is not connected to the second gear. When the first gear rotates in the other direction relative to the second gear, the planetary gear does not rotate freely in the depression so that the first gear is connected to the second gear.

In the invention, it is possible to make the gear assembly small due to the planetary gear. Alternatively, a known one-way clutch may be used as the gear assembly of the present invention other than the configuration described above. Such a one-way clutch includes a "Claw clutch", "Coil grab friction clutch", or a "Free rotation clutch" disclosed in Mechanism, vol. 1, No. 18, Sep. 10, 1983 (Technical Report Publication).

According to the present invention, in the power transmission device, the two gear assemblies and idle gear are retained in a housing, so that the device is assembled as a unit. Therefore, it is possible to improve handling and installing the device in an applicable driving apparatus. Alternatively, the two gear assemblies and idle gear may be attached directly to a shaft bearing provided on an applicable driving apparatus without the housing. In addition, in the power transmission device of the present, the second gear of the other gear assembly may be set to be the output shaft side, or the second gear of the one gear assembly may be set to be the output shaft side.

In the present invention, the external teeth and internal teeth of the first gear are continuously formed on outer and inner surfaces of the peripheral wall of a cylindrical body as an external gear wheel and an internal gear wheel, respectively. The external teeth of the second gear are continuously formed on an outer surface of the peripheral wall of a cylindrical body or shaft as an external gear wheel.

In the invention, the input shaft side indicates a portion or place where a rotational force is applied to the first gear of the gear assembly, including a case that the first gear is rotated through an input shaft attached to the first gear, or the first gear is rotated through a separate gear wheel attached to the external teeth of the first gear. The output shaft side indicates a portion or place where a rotational force is applied to the driving apparatus from the second gear of the gear assembly, including a case that a rotational force is applied to the driving apparatus through an output shaft attached to the second gear, or a rotational force is applied to the driving apparatus through a separate gear wheel attached to the external teeth of the second gear.

BRIEF DESCRIPTION OF THE DRAWINGS

FIGS. 3(a)–3(c) are views showing a structure of the power transmission device in FIG. 1 seen from above, wherein

FIGS. 5(a) and 5(b) are views showing a first gear constituting a gear assembly of the power transmission device, wherein

FIGS. 6(a) and 6(b) are views showing a second gear constituting the gear assembly of the power transmission device, wherein FIG. 6(a) is a top view of the second gear.

DETAILED DESCRIPTION OF PREFERRED EMBODIMENTS

Figure 1:
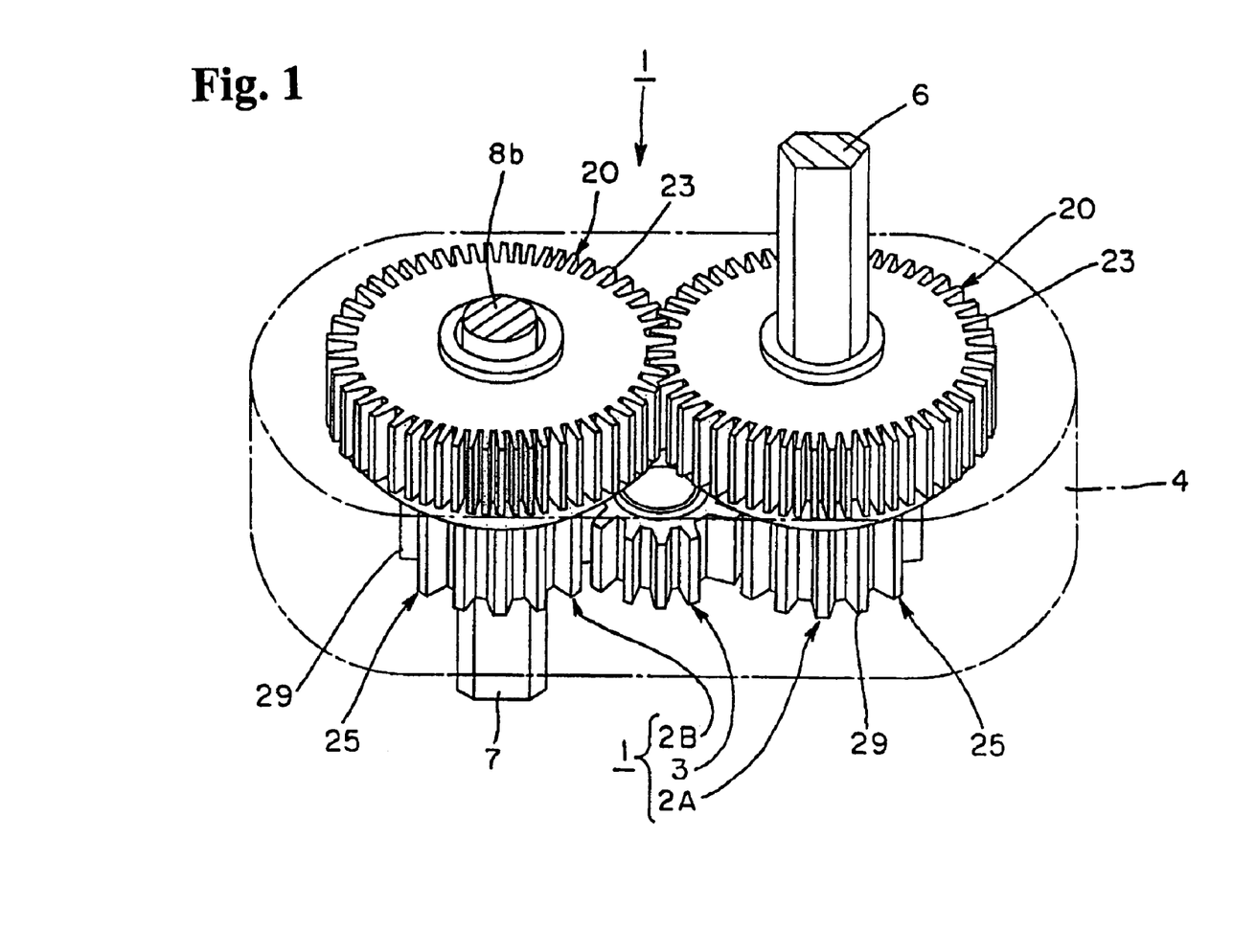
FIG. 1 is a schematic view showing a power transmission device according to the present invention.
Figure 2A:
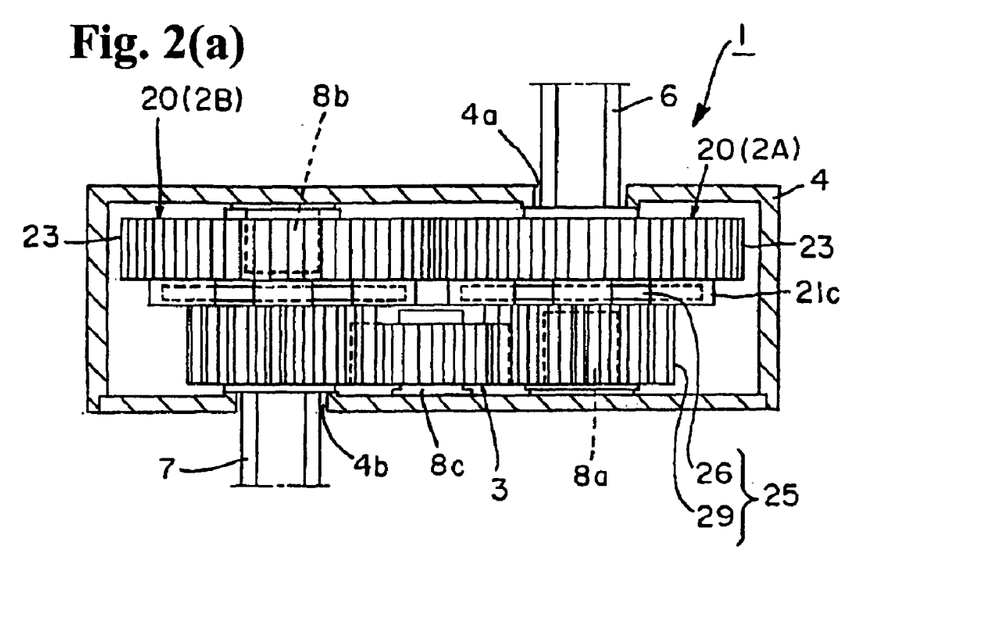
FIGS. 2(a) and 2(b) are sectional views showing a structure of the power transmission device in FIG. 1.
Figure 2B:
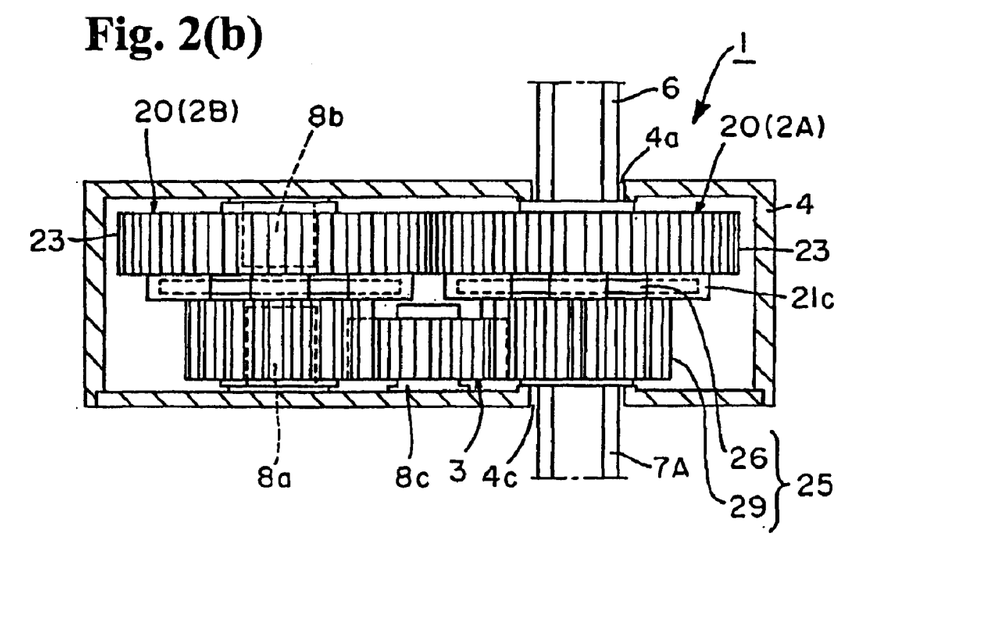
Figure 3A:
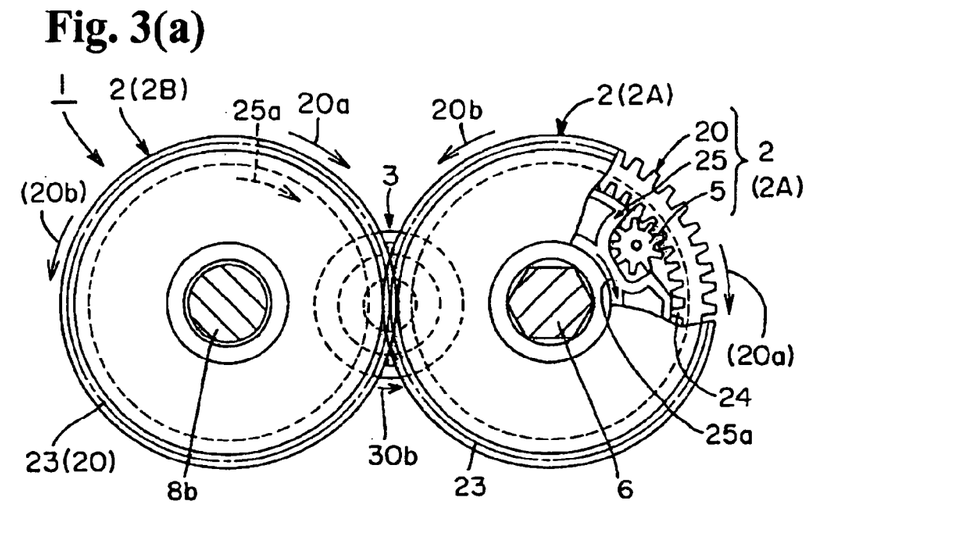
FIG. 3(a) is a partially sectional view showing the structure.
Figure 3B:
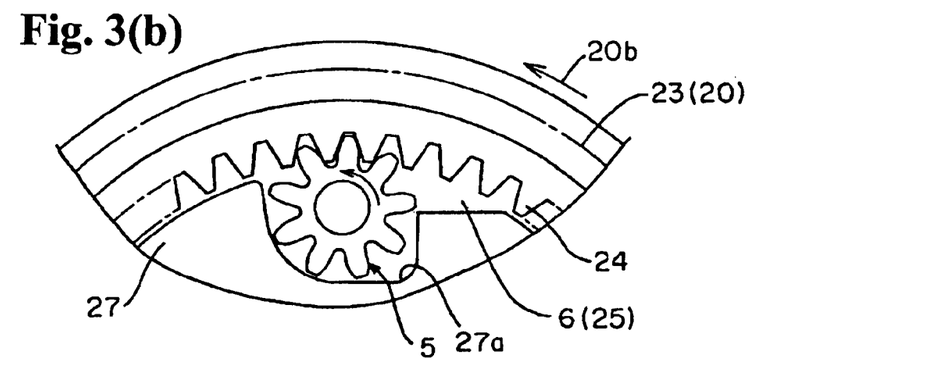
FIGS. 3(b) and 3(c) are enlarged views showing an operation of a planetary gear.
Figure 3C:
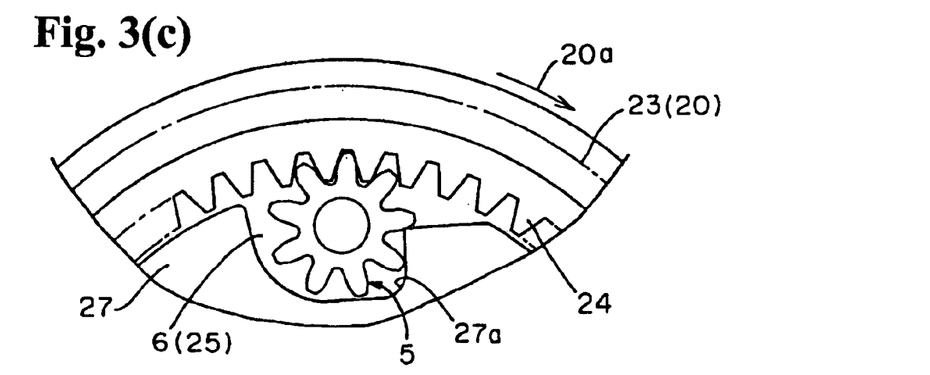
Figure 4A:
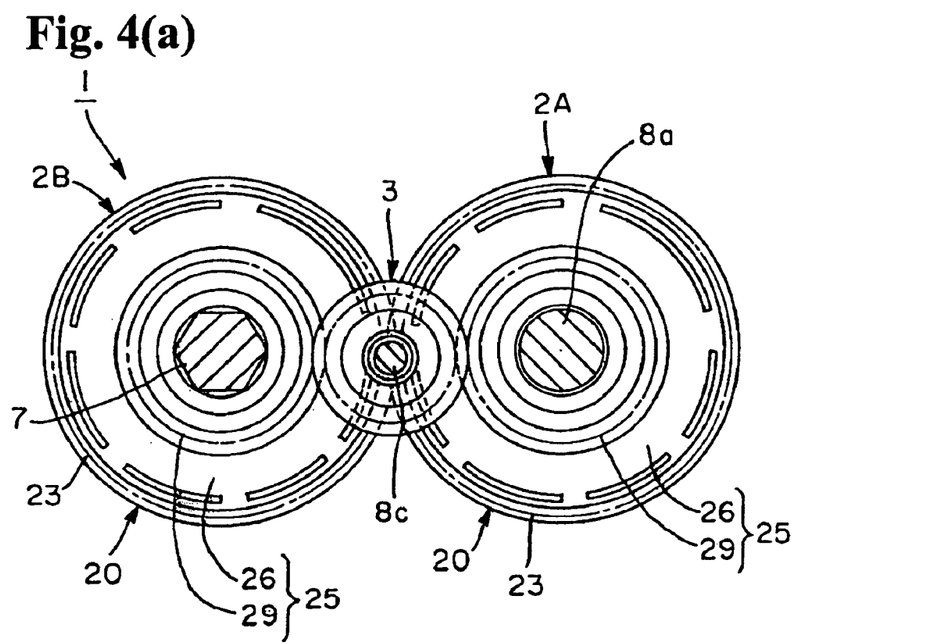
FIGS. 4(a) and 4(b) are views showing the power transmission device seen from an idle gear side.
Figure 4B:
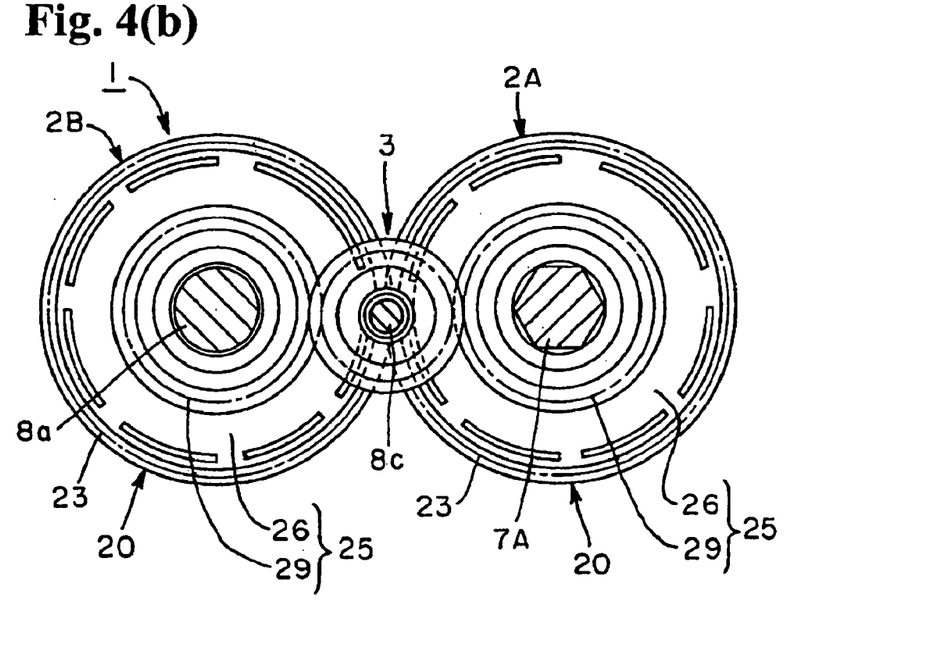

Hereunder, embodiments of the present invention will be explained with reference to the accompanying drawings. FIG. 1 is a schematic view of a power transmission device. FIGS. 2(a) and 2(b) are cross sectional views showing a structure of the power transmission device. FIG. 3(a) is a partially sectional view showing a structure of the device seen from above, and FIGS. 3(b) and 3(c) are enlarged views showing an operation of a planetary gear. FIGS. 4(a) and 4(b) are views showing the power transmission device seen from an idle gear side.

Figure 5A:
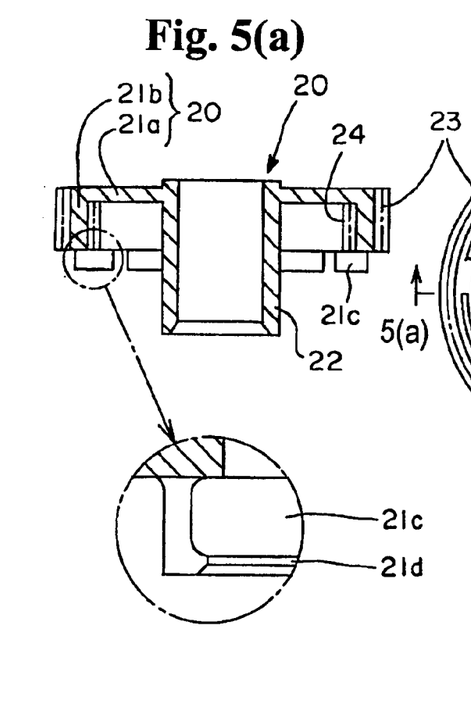
FIG. 5(a) is a cross sectional view taken along line 5(a)—5(a) in FIG. 5(b) and FIG. 5(b) is a bottom view of the first gear.
Figure 5B:
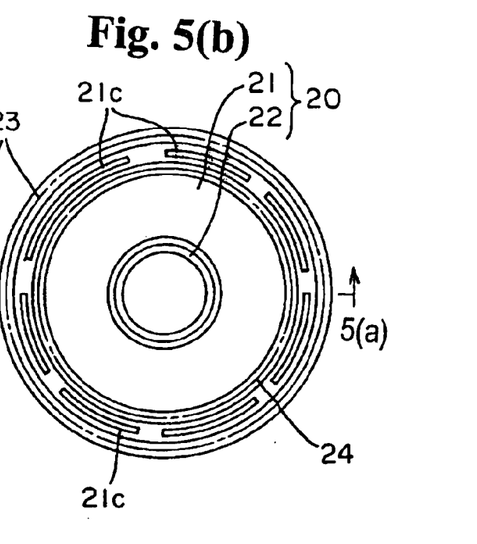
Figure 6A:
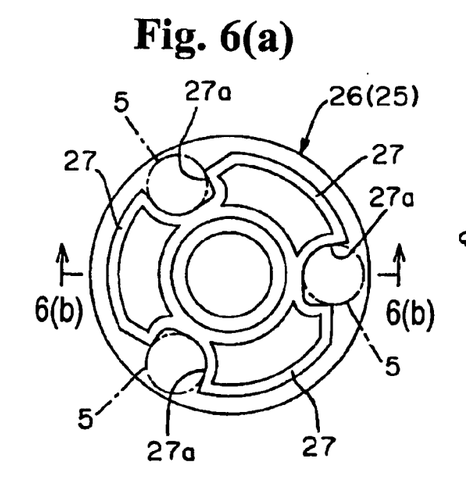
Figure 6B:
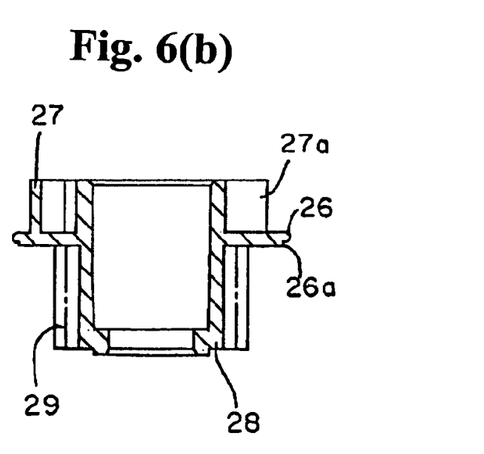
FIG. 6(b) is a cross sectional view taken along line 6(b)—6(b) in FIG. 6(a)

FIGS. 5(a) and 5(b) are views showing a first gear constituting a gear assembly of the power transmission device, wherein FIG. 5(a) is a cross sectional view taken along line 5(a)—5(a) in FIG. 5(b), and FIG. 5(b) is a bottom view of the first gear. FIGS. 6(a) and 6(b) are views showing a second gear constituting a gear assembly of the power transmission device, wherein FIG. 6(a) is a top view of the second gear, and FIG. 6(b) is a cross sectional view taken along line 6(b)—6(b) in FIG. 6(a). Hereinafter, a summary of the power transmission device, structural components, an assembled example, and an operation of the power transmission device will be described, and then an application example will be explained.

Figure 7A:
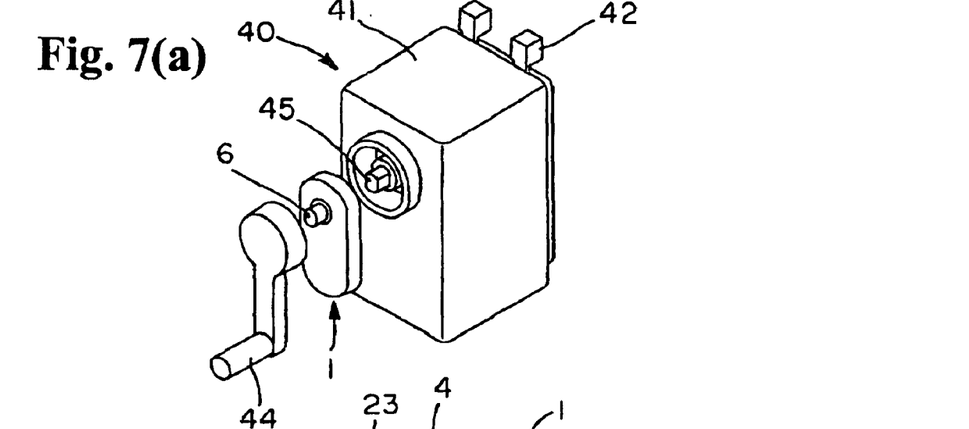
FIGS. 7(a) and 7(b) are views showing an application example of the power transmission device.
Figure 7B:
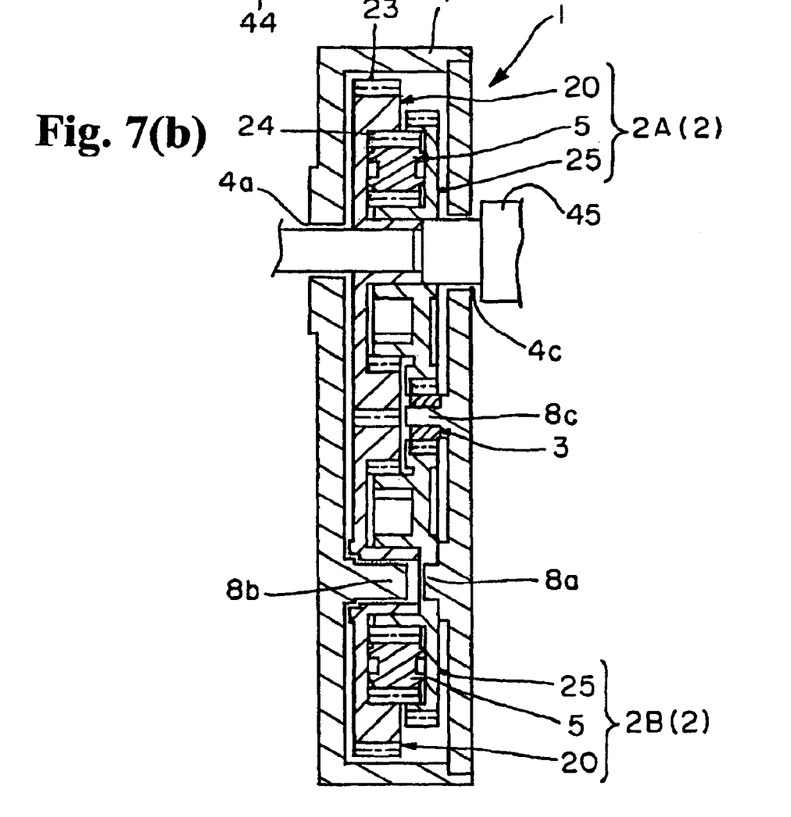

According to an embodiment of the present invention, a power transmission device 1 is composed of two gear assemblies 2 and an idle gear 3 as a unit. Each of the gear assemblies 2 (2A, 2B) functions as a one-way clutch in a gear structure. Usually, the gear assemblies 2A and 2B and the idle gear 3 are disposed in a housing 4 as a unit. For example, in a manual pencil sharpener 40 as shown in FIGS. 7(a) and 7(b), the unit is disposed between a handle 44 and a shaft (output shaft) 45 of a driving unit mounted on a main member 41. When the handle 44 is operated and makes a forward rotation or a reverse rotation, the shaft 45 on the driving unit is always rotated in the same direction.

In the embodiment, the gear assembly 2 includes the first gear 20, second gear 25, and several planetary gears 5. Both gear assemblies 2A and 2B have substantially the same gear ratio. The first gear 20, second gear 25, and planetary gears 5 are formed of a resin or metal.

As shown in FIGS. 5(a) and 5(b), the first gear 20 includes a roughly cap-shaped main member 21 divided by an end wall 21a and a peripheral wall 21b; a cylindrical boss 22 projecting from an inner surface of a main member 21; and external teeth 23 and internal teeth 24 formed on the peripheral wall 21b. The end wall 21a has a hole communicating with an inside of the boss 22, and the peripheral wall 21b has several mounting projections 21c projecting at an end surface thereof with a roughly equal interval. Each of the mounting projections 21c, as shown in FIG. 5(a), includes a claw 21d at an end portion thereof.

The second gear 25 includes a holding portion 26 having a disk shape to be fitted in the main member 21 of the first gear; a longitudinal rib 27 projecting from an upper surface of the holding portion 26 and having depressions 27a at several places (three places in the embodiment); a cylindrical boss 28 projecting from a bottom surface of the holding portion 26; and external teeth 29 continuously formed on the boss 28. The holding portion 26 has a hole communicating with an inside of the boss 28, and also has a step 26a at a lower portion thereof. The longitudinal rib 27 has a height slightly higher than a thickness of the planetary gear 3, and has the depressions 27a at a rib portion on the same circle. The depressions 27a are disposed with an equal interval, and have openings toward outside.

As shown in FIG. 3(b), each of the depressions 27a has specific features as follows. The depression has an inner space large enough so that the planetary gear 5 can rotate freely with a play when the planetary gear 5 is disposed in the depression. The depression has two opposing walls, and one of the walls (located in a clockwise direction) has a height shorter than that of the other wall (located in a counterclockwise direction). The one of the opposing walls with the shorter height is inclined at a roughly right angle or acute angle relative to an intermediate wall of the depression. On the other hand, the other of the opposing walls with the longer height is formed in an arc or is inclined at an obtuse angle relative to the intermediate wall of the depression. The depression 27a may have a shape with the projections 58 as shown in FIGS. 8(b) and 8(c).

The planetary gear 5 has teeth with a pitch engaging the internal teeth 24 of the first gear 20. The boss 28 has a cylindrical shape with a large inner diameter from top to a portion close to a bottom, so that the boss 22 of the first gear 20 can be inserted to rotate freely. The boss 28 has a hole with a small diameter at a lower end thereof. The external teeth 29 have a pitch engaging the idle gear 3.

The first gear 20 and the second gear 25 are interconnected and assembled into the gear assembly 2 after each of the planetary gears 5 is disposed in the depression 27a of the holding portion 26, respectively. In the assembly operation, after the boss 22 of the first gear 20 is inserted in the hole of the boss 28 of the second gear 25, the first gear 20 is pressed into the holding portion 26 of the second gear 25. Accordingly, the projection 21c at the periphery of the holding portion 26 bends elastically, and the claw 21d engages to hold the first gear 20 and second gear 25 together. In the gear assemblies 2 (2A, 2B), the planetary gear 5 engages the internal teeth 24 of the first gear 20.

When the first gear 20 is rotated in one direction (a reverse rotation 20b, i.e. the counterclockwise direction, in FIGS. 3(a) and 3(b)), the planetary gear 5 rotates freely in the depression 27a so that the first gear 20 and second gear 25 are not interconnected. When the first gear 20 is rotated in the other direction (a forward rotation 20a, i.e. the clockwise direction, in FIGS. 3(a) and 3(c)), the planetary gear 5 is fixed in the depression 27a so that the first gear 20 and second gear 25 are interconnected. When the first gear 20 and second gear 25 are interconnected, as shown in FIG. 3(c), the teeth of the planetary gear 5 abut against a corner of the opposing wall of the depression 27a with a shorter height.

The gear assembly 2 functions as a one-way clutch similar to the one shown in FIGS. 8(a)–8(c). The depressions 27a and planetary gears 5 may be replaced with the configuration shown in FIGS. 8(a)–8(c).

In the power transmission device 1 shown in FIGS. 1, 2(a) and 2(b), the gear assemblies 2A and 2B and the idle gear 3 are linked and housed in the housing 4. In the housing 4, the external teeth 23 of the first gear 20 in each of the gear assemblies 2A and 2B engage each other, and the external teeth 27 of the second gear 25 of the gear assemblies 2A and 2B engage the idle gear 3 rotatably supported in the housing. The housing 4 is made of a resin, and has axes for supporting the gears and axial holes for inserting input and output shafts.

In FIGS. 2(a) and 4(a), the second gear 25 of the gear assembly 2B is set to engage the output shaft 7. The housing 4 includes a hole 4a for passing through the input shaft 6 connected to the first gear 20 of the gear assembly 2A; a hole 4b for passing through the output shaft 7 connected to the second gear 25 of the gear assembly 2B; a shaft 8a for supporting the second gear 20 of the gear assembly 2A; a shaft 8b for supporting the first gear 20 of the gear assembly 2B; and a shaft 8c for supporting the idle gear 3.

In FIGS. 2(b) and 4(b), the second gear 25 of the gear assembly 2A is set to engage the output shaft 7A. The housing 4 includes the hole 4a, a hole 4c for allowing the output shaft 7A to pass therethrough, the shaft 8b, the shaft 8c, and the shaft 8a for supporting the second gear 25 of the gear assembly 2B. The output shaft 6 is fixed to the hole of the boss 22 of the first gear 20 in the gear assembly 2A, the output shaft 7 is fixed to the hole of the boss 28 of the second gear 25 of the gear assembly 2B, and the output shaft 7A is fixed to the hole (the hole at a lower side) of the boss 28 of the second gear 25 in the gear assembly 2A. As a method of fixing, an engagement structure or screw structure of a shaft with a key and a key hole, for example, may be used in addition to press fitting.

In the power transmission device 1 shown in FIGS. 2(a), 3(a), 3(b), 3(c) and 4(a), when the first gear 20 of the right gear assembly 2A is set to be the input shaft and the second gear 25 of the left gear assembly 2B is set to be the output shaft, the output shaft 7 always rotates in the same direction regardless that the input shaft 6 makes the forward rotation or reverse rotation.

In each of the gear assemblies 2A and 2B, the second gear 25 is interconnected to the first gear 20 when the first gear 20 makes the forward rotation 20a (refer to FIG. 3(c)), and the second gear 25 is not interconnected when the first gear 20 makes the reverse rotation 20b (the first gear rotates idle relative to the second gear, refer to FIG. 3(b)).

Accordingly, when the input shaft (first gear) in the right gear assembly 2A makes the reverse rotation 20b (rotates idle relative to the second gear 25 in the gear assembly), the first gear 20 in the left gear assembly 2B makes the forward rotation 20a, the second gear 25 in the left gear assembly 2B makes the forward rotation 25a, the idle gear 3 makes a reverse rotation 30b, and the second gear 25 in the right gear assembly 2A makes the forward rotation 25a, so that the power is transmitted.

Also, when the input shaft side (first gear) in the right gear assembly 2A makes the forward rotation 20a (the second gear 25 in the right gear assembly is interconnected), the second gear 25 in the right gear assembly 2A makes the forward rotation 25a, the idle gear 3 makes the reverse rotation 30b, the second gear 25 in the left gear assembly 2B makes the forward rotation 25a, and the first gear 20 in the left gear assembly 2B makes the reverse rotation 20b, so that the power is transmitted.

Therefore, in the power transmission device 1, when the second gear 25 in the left gear assembly 2B is set to be the output shaft, the second gear 25 always makes the forward rotation 25a regardless of the rotational directions (forward rotation 20a, reverse rotation 20b) of the input shaft, i.e. the first gear 20 in the right gear assembly 2A.

Further, as shown in FIGS. 2(b) and 4(b), when the second gear 25 of the right gear assembly 2A is set to be the output shaft, the second gear 25 always makes the forward rotation 25a regardless of the rotational directions (forward rotation 20a, reverse rotation 20b) of the input shaft, i.e. the first gear 20 in the right gear assembly 2A.

FIGS. 7(a) and 7(b) are views showing the application example of the power transmission device 1, in which FIG. 7(a) is a schematic view of a pencil sharpener with a handle and other part disassembled, and FIG. 7(b) is a longitudinal sectional view showing the power transmission device applied to the pencil sharpener. In this explanation, the same reference numerals designate components same as those in FIGS. 1 through 6(a) and 6(b), and the descriptions thereof are omitted.

A pencil sharpener 40 shown in FIGS. 7(a) and 7(b) includes a main member 41 having a driving unit for sharpening a pencil and a box for receiving waste; a chuck 42 capable of moving back and forth for holding the pencil in the state where the pencil is inserted in the main member 41; a handle 44 for driving the driving unit to rotate; and the power transmission device 1 provided between the handle 44 and a shaft (output shaft) 45 of the driving unit. The power transmission device 1 is basically the same as the one described above, and may have a different gear ratio. The shaft 45 of the driving unit is connected to the second gear 25 in the gear assembly 2A, and the handle 44 is connected to the first gear 20 in the gear assembly 2A through the input shaft 6.

In the pencil sharpener 40, through the power transmission device 1, the driving unit always makes the forward rotation regardless of the rotational directions of the handle 44, so that the pencil can be efficiently sharpened. The power transmission device 1 of the present invention is applied to the example shown in FIGS. 7(a) and 7(b) as well as a manual drilling machine and various types of driving apparatuses including a feeding device used in, for example, a printer or copy machine as a motor drive.

As described above, in the power transmission device of the present invention, the output shaft always rotates in the same direction regardless of the forward or reverse rotation of the input shaft. Therefore, it is not necessary to specify the rotational direction of an operating handle of, for example, various types of driving devices, so that the operational efficiency and the operation of the manual pencil sharpener or drilling machine, etc. can be improved. Further, the power transmission device of the invention uses a pair of the gear assemblies and the idle gear. Therefore, it is possible to make the device simple and small, suitable for high-speed rotation, and it is easy to apply to driving apparatuses just by changing a shape and a size of a gear or a gear ratio.

While the invention has been explained with reference to the specific embodiments of the invention, the explanation is illustrative and the invention is limited only by the appended claims.

What is claimed is:

1. A power transmission device for transmitting power from an input side to an output side, comprising:

a pair of gear assemblies, each including one first gear having a circular shape and external teeth formed on a peripheral wall of the first gear with the circular shape so that the first gear in one of the gear assemblies engages the first gear in the other of the gear assemblies, one second gear having a circular shape and external teeth formed on a peripheral wall of the second gear with the circular shape, and a clutch mechanism situated between the first and second gears such that said first gear is connected to the second gear when the first gear rotates in one direction relative to the second gear, and said first gear is separated from the second gear when the first gear rotates in the other direction relative to the second gear, and an idle gear rotatably supported, and engaging the external teeth of the second gears of the gear assemblies.

2. A power transmission device for transmitting power from an input side to an output side, comprising:

a pair of gear assemblies, each including a first gear having external teeth formed on a peripheral wall thereof so that the first gear in one of the gear assemblies engages the first gear in the other of the gear assemblies and internal teeth formed on the peripheral wall thereof, and a second gear having external teeth formed on a peripheral wall thereof and a holding portion having a depression with an opening facing the internal teeth of the first gear, and a clutch mechanism situated between the first and second gears such that said first gear is connected to the second gear when the first gear rotates in one direction relative to the second gear, and said first gear is separated from the second gear when the first gear rotates in the other direction relative to the second gear, and an idle gear rotatably supported and engaging the external teeth of the second gears of the gear assemblies.

3. A power transmission device according to claim 2, wherein said clutch mechanism includes a planetary gear disposed in the depression of the second gear for engaging the internal teeth of the first gear, said planetary gear being arranged such that the planetary gear is fixed in the depression to connect the first gear to the second gear when the first gear rotates in the one direction relative to the second gear, and the planetary gear rotates freely in the depression to separate the first gear from the second gear when the first gear rotates in the other direction relative to the second gear.

4. A power transmission device according to claim 3, wherein said holding portion of the second gear includes a smooth surface so that the planetary gear freely rotates in the depression, and an engaging portion so that the planetary gear engages the second gear.

5. A power transmission device according to claim 1, further comprising a housing for retaining the pair of the gear assemblies and the idle gear.

6. A power transmission device according to claim 1, further comprising an input shaft connected to the first gear in one of the gear assemblies, and an output shaft connected to the second gear of the other of the gear assemblies.

7. A power transmission device according to claim 1, further comprising an input shaft connected to the first gear in one of the gear assemblies, and an output shaft connected to the second gear of the same one of the gear assemblies.

8. A power transmission device according to claim 1, wherein said clutch mechanism is located inside the first gear.

* * * * *